(12) United States Patent
Wu (10) Patent No.: US 12,513,770 B2
(45) Date of Patent: Dec. 30, 2025

(54) ACCESS PROCEDURE PROCESSING METHOD BASED ON MATCHING BETWEEN TRANSMISSION DATA AND FIRST CONDITION, APPARATUS AND COMMUNICATION DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 441 days.

(21) Appl. No.: 18/074,439

(22) Filed: Dec. 2, 2022

(65) Prior Publication Data

US 2023/0109276 A1    Apr. 6, 2023

Related U.S. Application Data (63) Continuation of application No. PCT/CN2021/099324, filed on Jun. 10, 2021.

(30) Foreign Application Priority Data

Jun. 11, 2020    (CN) .......................... 202010531606.3

(51) Int. Cl.
  *H04W 74/08*    (2024.01)
  *H04W 74/0833*    (2024.01)
  (Continued)

(52) U.S. Cl.
  CPC ....... *H04W 76/20* (2018.02); *H04W 74/0833* (2013.01); *H04W 74/0836* (2024.01)

(58) Field of Classification Search
  CPC .......................... H04W 74/0833; H04W 76/20
  See application file for complete search history.

(56) References Cited

U.S. PATENT DOCUMENTS

2020/0351022 A1*  11/2020  Choe ................. H04L 1/1812
2022/0095391 A1*  3/2022  Jo ...................... H04W 74/002
(Continued)

FOREIGN PATENT DOCUMENTS

| CN | 108271125 A | 7/2018 |
| CN | 109756994 A | 5/2019 |
| WO | 2020088097 A1 | 5/2020 |

OTHER PUBLICATIONS

International Search Report issued in corresponding International Application No. PCT/CN2021/099324, mailed Aug. 20, 2021, 4 pages.

*Primary Examiner* — Mewale A Ambaye
(74) *Attorney, Agent, or Firm* — IPX PLLC (57) ABSTRACT

An access procedure processing method, an apparatus, and a communications device are provided. The method includes: performing matching between N pieces of to-be-transmitted transmission data and a first condition; and based on a matching result, executing a first access procedure or a second access procedure. M pieces of transmission data are transmitted in the first access procedure, the N pieces of the transmission data are not transmitted in the second access procedure, and the M pieces of the transmission data are data matching the first condition in the N pieces of the transmission data. M and N are positive integers, and M is less than or equal to N. The first condition is a restriction condition for the data transmitted during the access procedure. The first condition includes: first bearer information corresponding to the transmission data or a first transmission mode matching configuration information.

20 Claims, 4 Drawing Sheets

---

Perform matching between N pieces of to-be-transmitted transmission data and a first condition — 201

Based on a matching result, execute a first access procedure or a second access procedure — 202

(51) Int. Cl.
*H04W 76/20* (2018.01)
*H04W 74/0836* (2024.01)

(56) References Cited

U.S. PATENT DOCUMENTS

| | | | |
|---|---|---|---|
| 2023/0262818 A1* | 8/2023 | Kim | H04W 76/19 |
| | | | 370/328 |
| 2023/0328763 A1* | 10/2023 | Babaei | H04W 48/20 |
| 2024/0107616 A1* | 3/2024 | Kim | H04W 76/15 |
| 2024/0147328 A1* | 5/2024 | Kim | H04W 36/08 |

* cited by examiner

ACCESS PROCEDURE PROCESSING METHOD BASED ON MATCHING BETWEEN TRANSMISSION DATA AND FIRST CONDITION, APPARATUS AND COMMUNICATION DEVICE

CROSS-REFERENCE TO RELATED APPLICATIONS

This application is a continuation of International Application No. PCT/CN2021/099324, filed Jun. 10, 2021, which claims priority to Chinese Patent Application No. 202010531606.3, filed Jun. 11, 2020. The entire contents of each of the above-referenced applications are expressly incorporated herein by reference.

TECHNICAL FIELD

This application relates to the field of communications technologies, and in particular, to an access procedure processing method, an apparatus, and a communications device.

BACKGROUND

In a New Radio (NR) system, to support sending small data, a network side only retains context configuration information of a master cell group (MCG) of UE when releasing a terminal (User Equipment, UE) from a connected state to an IDLE state or an INACTIVE state. When the UE wants to send small data, if the system message on the network side indicates that sending small data is supported, the UE in the IDLE/INACTIVE state does not enter the connected state through the foregoing method, but directly receives or sends data. However, in a case that the UE is configured with a plurality of bearers and a plurality of cell groups, how to resume data and connection is a technical problem to be urgently resolved.

SUMMARY

Embodiments of this application are intended to provide an access procedure processing method, an apparatus, and a communications device.

According to a first aspect, an access procedure processing method is provided and includes:
  performing matching between N pieces of to-be-transmitted transmission data and a first condition; and
  based on a matching result, executing a first access procedure or a second access procedure.

M pieces of transmission data are transmitted in the first access procedure, the N pieces of the transmission data are not transmitted in the second access procedure, and the M pieces of the transmission data are data matching the first condition in the N pieces of the transmission data, where the M and the N are positive integers, and the M is less than or equal to the N. The first condition is a restriction condition for the data transmitted during the access procedure, where the first condition includes: first bearer information corresponding to the transmission data and/or a first transmission mode matching configuration information, and the configuration information includes second bearer information and/or a second transmission mode.

According to a second aspect, an access procedure processing apparatus is provided and includes:
  a matching module, configured to perform matching between N pieces of to-be-transmitted transmission data and a first condition; and
  a processing module, configured to, based on a matching result, execute a first access procedure or a second access procedure.

M pieces of transmission data are transmitted in the first access procedure, the N pieces of the transmission data are not transmitted in the second access procedure, and the M pieces of the transmission data are data matching the first condition in the N pieces of the transmission data, where the M and the N are positive integers, and the M is less than or equal to the N. The first condition is a restriction condition for the data transmitted during the access procedure, where the first condition includes: first bearer information corresponding to the transmission data and/or a first transmission mode matching configuration information, and the configuration information includes second bearer information and/or a second transmission mode.

According to a third aspect, a communications device is provided. The communications device includes: a processor, a memory, and a program or an instruction stored in the memory and capable of running on the processor, where when the program or the instruction is executed by the processor, the steps of the method according to the first aspect are implemented.

According to a fourth aspect, a readable storage medium is provided. The readable storage medium stores a program or an instruction, and when the program or the instruction is executed by a processor, the steps of the method according to the first aspect are implemented.

According to a fifth aspect, a chip is provided. The chip includes a processor and a communications interface, the communications interface is coupled to the processor, and the processor is configured to run a program or an instruction of a network device, to implement the method according to the first aspect.

According to a sixth aspect, a computer software product is provided. The computer software product is stored in a non-volatile storage medium, and the software product is executed by at least one processor, to implement the steps of the method according to the first aspect.

According to a seventh aspect, a communications device is provided. The communications device is configured to perform the method according to the first aspect.

In the embodiments of this application, matching is performed between N pieces of to-be-transmitted transmission data and a first condition, and based on a matching result, a first access procedure or a second access procedure is executed. M pieces of transmission data are transmitted in the first access procedure. The N pieces of the transmission data are not transmitted in the second access procedure. The M pieces of the transmission data are data matching the first condition in the N pieces of the transmission data. The first condition includes: first bearer information corresponding to the transmission data and/or a first transmission mode matching configuration information, and the configuration information includes second bearer information and/or a second transmission mode.

DETAILED DESCRIPTION

The following clearly describes the technical solutions in the embodiments of the present application with reference to the accompanying drawings in the embodiments of the present application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the data used in this way may be interchangeable in appropriate circumstances so that the embodiments of this application described can be implemented in other orders than the order illustrated or described herein, and objects distinguished by "first" and "second" are usually of one type, which does not limit a quantity of the objects, for example, a first object may be one or more than one. In addition, in the specification and claims, "and/or" is used to indicate at least one of the connected objects, and the character "/" usually indicates that associated objects are in an "or" relationship.

It should be noted that the technologies described in the embodiments of this application are not limited to Long Term Evolution (LTE)/LTE-Advanced (LTE-A) systems, and may also be used in various wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" in the embodiments of this application are often used interchangeably, and the technologies described may be used in the systems and radio technologies mentioned above, and may also be used in another system and radio technology. However, in the following descriptions, a New Radio (NR) system is described for an illustration purpose, and NR terms are used in most of the following descriptions, although these technologies may also be applied to other applications than an NR system application, for example, a 6th Generation (6G) communications system.

Figure 1:
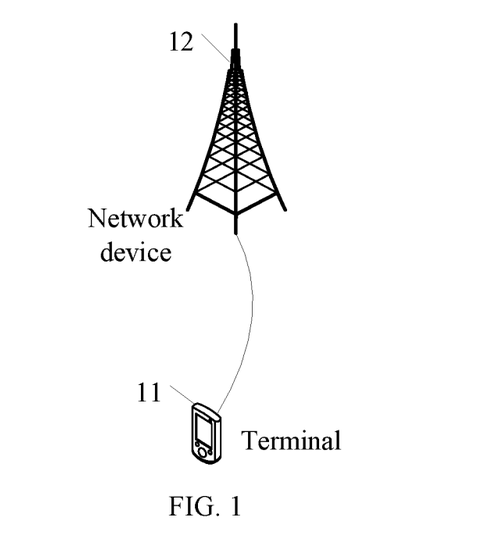
FIG. 1 is a structural diagram of a network system to which an embodiment of this application may be applied.

FIG. 1 is a block diagram of a wireless communications system to which an embodiment of this application may be applied. The wireless communications system includes a terminal 11 and a network-side device 12. The terminal 11 may also be referred to as a terminal device or User Equipment (UE). The terminal 11 may be a terminal-side device, for example, a mobile phone, a tablet personal computer, a laptop computer, a notebook computer, a Personal Digital Assistant (PDA), a palmtop computer, a netbook, an ultra-mobile personal computer UMPC, a Mobile Internet Device (MID), a wearable device, or Vehicle User Equipment (VUE), and Pedestrian User Equipment (PUE). Wearable devices include: bracelets, earphones, glasses, and the like. It should be noted that a specific type of the terminal 11 is not limited in the embodiments of the present application. The network-side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a Node B, an evolved node B (eNB), a home NodeB, a home evolved NodeB, a Wireless Local Area Network (WLAN) access point, a Wi-Fi (Wireless Fidelity) node, a Transmitting Receiving Point (TRP), or some other appropriate term in the art. As long as the same technical effect is achieved, the base station is not limited to a specific technical term. It should be noted that the base station in the NR system is taken only as an example in the embodiments of this application, but a specific type of the base station is not limited.

For ease of understanding, some content related to the embodiments of the present invention is described below.

1. Small Data Transmission (SDT)

Based on a resource configured by a network device, when UE is in an IDLE/INACTIVE state, data can be directly sent to the network device by using the following method:

a Msg 3 of 4-step random access procedure for initial access;

a Msg A of 2-step random access procedure for initial access;

a dedicated uplink resource configured by a network, for example, a Physical Uplink Shared Channel (PUSCH) resource, that is, a pre-configured PUSCH; or a Preallocated Uplink Resource (PUR).

A network device can directly send data to the UE by using the following method:

a Msg 4 of 4-step random access procedure for initial access;

a Msg B of 2-step random access procedure for initial access; and a downlink feedback resource corresponding to the dedicated uplink resource configured by the network.

When a network side releases the UE from a connected state to the IDLE/INACTIVE state, a context configuration information of the UE is retained. When the UE sends small data, if a system message of the network side indicates that sending small data is supported, for example, sending small data smaller than 10 Kbyte is supported, the UE in the IDLE/INACTIVE state does not enter the connected state through the above method, but directly receives or sends data.

2. New 2-Step Random Access Channel (2-Step RACH)

Step 0: A network device configures a new 2-step random access configuration information for UE, including, for example, sending resource information corresponding a Msg A and a Msg B.

Step 1: The UE triggers a 2-step RACH procedure, and sends request information to a network side, for example, sends the Msg A by using a PUSCH. In addition, the UE may also send Physical Random Access Channel (PRACH) information to the network device.

Step 2: The network device sends confirmation information to the UE, and the confirmation information is the Msg B. If the UE fails to receive the Msg B, the UE sends the Msg A.

3. Conventional 4-Step Random Access Procedure

A random access procedure of UE includes any one of the following:

a contention-based random access procedure; or
a non-contention-based random access procedure.

The random access procedure can be understood as a 4-step random access procedure, that is, a 4-step RACH.

In the "contention-based random access procedure", the UE sends a Msg 1 to a network device, and the Msg 1 can be understood as a random access request. After receiving the Msg 1, the network device sends a Msg 2 to the UE. The Msg 2 can be understood as a Random Access Response (RAR) message. The message carries uplink grant information. According to the uplink grant in the Msg 2, the UE executes a Medium Access Control (MAC) layer packet assembly function to generate a MAC Protocol Data Unit (PDU), and stores the MAC PDU in a Msg 3 buffer. Then the UE sends the MAC PDU in the Msg 3 buffer through a Hybrid Automatic Repeat Request (HARQ) process. After receiving the Msg 3, the network device sends a Msg 4 to the UE, for example, a contention resolution identity. The UE receives the Msg 4, and determines whether contention is successfully resolved. If the contention is successfully resolved, the random access procedure succeeds; otherwise, the UE re-initiates a random access procedure. In the re-initiated random access procedure, when the UE receives the uplink grant in the Msg 2 again, the UE directly fetches the previously stored MAC PDU from the Msg 3 buffer and sends the MAC PDU through the HARQ process. After the random access procedure is completed, the UE may clear a HARQ buffer that is for transmission of the Msg 3 in the random access procedure.

For a CONNECTED UE, Msg 4 contention resolution verification is that uplink transmission scheduled by a physical downlink control channel PDCCH) of a Cell Radio Network Temporary Identifier (C-RNTI) is new transmission.

For IDLE/INACTIVE UE, the Msg 4 contention resolution verification is that UE contention resolution identity information received by the UE in the MAC Control Element (CE) used for carrying UE contention resolution identity matches first 48 bits of an uplink UL common control channel CCCH) service data unit (SDU) sent by the UE. The MAC CE used for carrying the UE contention resolution identity may be a UE Contention Resolution Identity MAC CE. 4. Dual Connectivity (DC)

In an NR system using a DC architecture, two cell groups: an MCG and an SCG (Secondary Cell Group) are included. The MCG corresponds to a Master Node (MN) of a network device, and the SCG corresponds to a Secondary Node (SN) of the network device. A primary cell of the MCG is referred to as a PCell (Primary Cell), and a primary cell of the SCG is referred to as a PSCell (Primary Secondary Cell). The PCell and the PSCell are collectively referred to as a SpCell (Special Cell). Secondary cells of the MCG and the SCG are referred to as SCells (Secondary Cell). A Signaling Radio Bearer 1 (SRB 1) is a signaling bearer between UE and the MCG, and an SRB 3 is a signaling bearer between the UE and the SCG.

Bearer Types of the UE include:
an MCG Radio Bearer (RB): one PDCP and one RLC corresponding to the RB are in the MCG;
an SCG RB: one PDCP and one RLC corresponding to the RB are in the SCG; and
a split RB: one Packet Data Convergence Protocol (PDCP) corresponding to the RB is in the MCG or the SCG, and two Radio Link Control (RLC) corresponding to the RB are in the MCG and the SCG separately.

The following specifically describes the access procedure processing method provided in the embodiments of this application through specific embodiments and application scenarios thereof with reference to the accompanying drawings.

Figure 2:
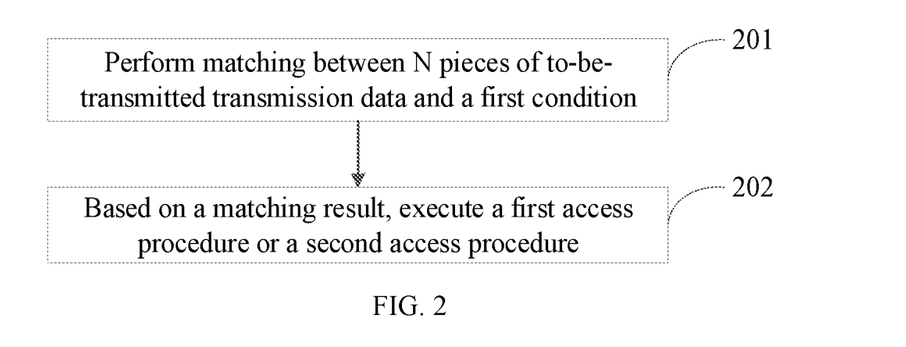
FIG. 2 is a flowchart of an access procedure processing method according to an embodiment of this application.

Referring to FIG. 2, FIG. 2 is a flowchart of an access procedure processing method according to an embodiment of this application. The method is performed by a network device or a terminal. As shown in FIG. 2, the method includes the following steps.

Step 201: Perform matching between N pieces of to-be-transmitted transmission data and a first condition.

Step 202: Based on a matching result, execute a first access procedure or a second access procedure.

M pieces of transmission data are transmitted in the first access procedure, the N pieces of the transmission data are not transmitted in the second access procedure, and the M pieces of the transmission data are data matching the first condition in the N pieces of the transmission data, where the M and the N are positive integers, and the M is less than or equal to the N. The first condition is a restriction condition for the data transmitted during the access procedure, where the first condition includes: first bearer information corresponding to the transmission data and/or a first transmission mode matching configuration information, and the configuration information includes second bearer information and/or a second transmission mode.

The first condition can be understood as a restriction condition of a direct data sending or receiving mode. In this embodiment of this application, the "direct data sending or receiving" can be used for sending or receiving small data. In some embodiments, some or all of the N pieces of the transmission data are small data, and the M pieces of the transmission data can be understood as transmission data falling into the scope of the "direct data sending or receiving mode" in the N pieces of the transmission data.

The configuration information may be configured by a network device or agreed by a protocol, and may specifically include at least one of the second bearer information or the second transmission mode. It should be understood that the first condition corresponds to the configuration information. For example, when the configuration information only includes the second bearer information, the first condition is that the first bearer information corresponding to the transmission data matches the second bearer information; or when the configuration information only includes the second transmission mode, the above first condition can be understood as that the first transmission mode corresponding to the transmission data matches the second transmission mode. When the configuration information includes the second bearer information and the second transmission mode, the first condition includes at least one of the following:

that the first bearer information corresponding to the transmission data matches the second bearer information; or that the first transmission mode corresponding to the transmission data matches the second transmission mode.

Matching can be understood as that the bearer information is the same and/or that the transmission mode is the same. For example, the first bearer information corresponding to the transmission data matching the second bearer information can be understood as that the first bearer information corresponding to the transmission data is the same as part of the bearer information in the second bearer information. The first transmission mode corresponding to the transmission data matching the second transmission mode can be understood as that the first transmission mode corresponding to the transmission data is the same as part or all of transmission modes of the second transmission mode.

It should be understood that "to-be-transmitted" can be understood as "to-be-sent" or "to-be-received". Transmitting the M pieces of the transmission data can be understood as sending the M pieces of the transmission data or receiving the M pieces of the transmission data. For example, a network device may send the M pieces of the transmission data during the execution of the first access procedure, and a terminal may receive the M pieces of the transmission data during the execution of the first access procedure. In some embodiments, the network device may receive the M pieces of the transmission data during the execution of the first access procedure, and the terminal may send the M pieces of the transmission data during the execution of the first access procedure.

In this embodiment of this application, matching is performed between the N pieces of the to-be-transmitted transmission data and the first condition, and based on the matching result, the first access procedure or the second access procedure is executed. The M pieces of the transmission data are transmitted in the first access procedure, the N pieces of the transmission data are not transmitted in the second access procedure, and the M pieces of the transmission data are data matching the first condition in the N pieces of the transmission data. The first condition includes: first bearer information corresponding to the transmission data and/or a first transmission mode matching configuration information, and the configuration information includes second bearer information and/or a second transmission mode. Because the bearer information and transmission mode are used as restriction conditions of the data transmitted in the access procedure, and a process of resuming data and connection is clarified, the embodiments of this application resolve the problem that how to resume data and connection when UE is configured with a plurality of bearers and a plurality of cell groups.

In this embodiment of this application, the executing a first access procedure can be understood as that the M pieces of the transmission data is allowed to be transmitted in the "direct data sending or receiving" mode. The configuration information can be understood as configuration information of the direct data sending or receiving mode.

In an embodiment, that based on a matching result, executing a first access procedure or a second access procedure includes:
  in a case that at least one piece of the N pieces of the transmission data satisfies the first condition, executing the first access procedure; or
  in a case that the N pieces of the transmission data do not satisfy the first condition, executing the second access procedure.

In this embodiment of this application, the second access procedure can be understood as skipping transmitting the transmission data in an initial access procedure. The first access procedure can be understood as transmitting transmission data satisfying the first condition in the initial access procedure. After the access procedure is completed, in a case that the terminal enters a connected state, transmission data that does not satisfy a preset condition can be sent. In this way, transmission delay of the transmission data satisfying the first condition can be reduced. For example, it is configured by a network device or agreed by a protocol that only an MCG DRB can receive or send data directly, while both the MCG DRB and the SCG DRB of the UE can send data.

Then, the UE only uses the "direct data sending or receiving" for the MCG DRB, while the SCG DRB is still in a suspended state.

In another embodiment, that based on a matching result, executing a first access procedure or a second access procedure includes:
  in a case that the N pieces of the transmission data satisfy the first condition, executing the first access procedure; or
  in a case that at least one piece of the N pieces of the transmission data does not satisfy the first condition, executing the second access procedure.

In this embodiment of this application, because the N pieces of the transmission data are transmitted in the initial access procedure only when the N pieces of the transmission data satisfy a first preset condition, and no transmission data in the N pieces of the transmission data is transmitted in the initial access procedure when at least one piece of the transmission data does not satisfy the first condition. In this way, when all the N pieces of the transmission data satisfy the first condition, the N pieces of the transmission data are transmitted. If at least one piece of the transmission data does not satisfy the first condition, the time for executing the access procedure can be shortened.

In some embodiments, the second bearer information may include at least one of the following: a bearer identity or a bearer type.

In this embodiment, a content contained in the first bearer information is a subset or a complete set of the second bearer information. For example, when the second bearer information includes a bearer identity, the first bearer information can be understood as the bearing identity. When the second bearer information includes a bearer type, the first bearer information can be understood as the bearer type. When the second bearer information includes a bearer identity and a bearer type, the first bearer information can be understood as at least one of the bearer identity or the bearer type.

The bearer type includes at least one of the following: an MCG Data Radio Bearer (DRB), an SCG DRB, an MCG split DRB, or an SCG split DRB.

The MCG split DRB can be understood as: a PDCP of the bearer is in the MCG, and the two RLCs of the bearer are in the MCG and the SCG separately. The SCG split DRB can be understood as: the PDCP of the bearer is in the SCG, and the two RLCs of the bearer are in the MCG and the SCG separately.

The bearer identity includes at least one of the following: a DRB identity, a Quality of Service flow (QoS flow) identity, a protocol data unit session identity, or a cell group identity.

It should be noted that in an embodiment, when the bearer type corresponding to a certain piece of transmission data is included in the second bearer information, it can be determined that the first bearer information corresponding to the piece of the transmission data matches the configuration information. In another embodiment, when the bearer identity corresponding to a certain piece of transmission data is included in the second bearer information, it can be determined that the first bearer information corresponding to the certain piece of the transmission data matches the configuration information. In another embodiment, when the bearer identity and the bearer type corresponding to a certain transmission data are included in the second bearer information, it can be determined that the first bearer information corresponding to the certain piece of the transmission data matches the configuration information.

In some embodiments, the second transmission mode includes at least one of the following: a data sending mode or a data receiving mode.

The data sending mode includes at least one of the following:
- that a terminal sends data in a Msg 3 in a 4-step random access procedure;
- that the terminal sends data in a Msg A in a 2-step random access procedure;
- that the terminal sends data in a configured dedicated uplink resource;
- that a network device sends data in a Msg 4 in the 4-step random access procedure;
- that the network device sends data in a Msg B in the 2-step random access procedure; or
- that the network device sends data in a downlink resource corresponding to the configured dedicated uplink resource.

Correspondingly, the date receiving mode includes at least one of the following:
- that the network device receives data in a Msg 3 in a 4-step random access procedure;
- that the network device receives data in a Msg B in a 2-step random access procedure;
- that the network device receives data in a configured dedicated uplink resource;
- that the terminal receives data in a Msg 4 in the 4-step random access procedure;
- that the terminal receives data in a Msg B in the 2-step random access procedure; or
- that the terminal receives data in a downlink resource corresponding to the configured dedicated uplink resource.

In this embodiment, the dedicated uplink resource can be understood as a dedicated uplink PUSCH resource. It should be understood that generally the first transmission mode can be understood as a data sending mode or a data receiving mode. It should be noted that in this embodiment of this application, when the first transmission mode corresponding to the transmission data is the same as a certain piece of the second transmission mode, it can be determined that the first transmission mode corresponding to the transmission data matches the configuration information.

In some embodiments, the data type of the N pieces of the transmission data can include at least one of control signaling or user data. In an embodiment, the M pieces of the transmission data includes at least one of the following:
- data of a DRB;
- data of quality of service flow;
- data of a PDU session; or
- a user plane data carried in an SRB.

The user plane data is added to a container in a CCCH message. The container includes a QoS flow of the user or PDU session data.

It should be understood that the configuration information is configured by a network device or agreed upon by a protocol.

In an embodiment, in a case that the configuration information is configured by a network device, the configuration information is carried in a radio resource control RRC release message or a System Information Block (SIB) message.

In some embodiments, before the performing matching between N pieces of the to-be-transmitted transmission data and a first condition, the method further includes:
- transmission indication information, where the indication information is used to instruct a terminal to retain a context configuration, and the context configuration is used to resume a connection and/or resume data transmission.

In this embodiment of this application, the context configuration may include a DRB configuration, a security configuration, and the like. The transmission indication information can be understood as suspend indication information. For example, in the RRC Release message, the network device sends the suspend indication information. When the terminal in the connected state is released to the IDLE/INACTIVE state, the network device instructs the terminal to retain the context configuration.

It should be understood that the configuration information can be sent with the transmission indication information in a same message, or in different messages, which is not further limited herein.

In some embodiments, the executing the first access procedure includes:
- before the M pieces of the transmission data is transmitted, executing a first operation.

The first operation includes any one of the following:
- Operation 1: In a case that the M pieces of the transmission data are transmitted through an MCG bearer, resume an MCG configuration of the bearer;
- Operation 2: In a case that the M pieces of the transmission data are transmitted through an SCG bearer, resume an SCG configuration of the bearer;
- Operation 3: In a case that the M pieces of the transmission data are transmitted through an MCG split bearer, resume an MCG configuration of the bearer;
- Operation 4: In a case that the M pieces of the transmission data are transmitted through an SCG split bearer, resume an SCG configuration of the bearer; or
- Operation 5: In a case that the M pieces of the transmission data are transmitted through the SCG split bearer, resume a PDCP configuration and an MCG configuration of the SCG split bearer.

For operation 1, only the MCG DRB may perform direct data receiving or sending as configured by the network device or agreed by the protocol, while the DRB corresponding to the data to be sent by the UE is the MCG DRB, and the UE uses the Msg 3 to send uplink data, then the UE resumes the configuration information corresponding to the MCG stored before sending the uplink data using the Msg 3. For example, the configuration information may include: PDCP configuration information of the SRB and the DRB corresponding to the MCG (for example, establishing a PDCP entity or rebuilding a PDCP entity; and restoring a PDCP state variable); a security context of the MCG; and a (header) compression function of the MCG.

For operation 2, the SCG DRB may perform direct data receiving or sending as configured by the network device or agreed by the protocol, while the DRB corresponding to the data to be sent by the UE is the SCG DRB, and the UE uses the Msg 3 to send uplink data, then the UE resumes the configuration information corresponding to the SCG stored before sending the uplink data using the Msg 3. For example, the configuration information may include: PDCP configuration information of the SRB and the DRB corresponding to the SCG; a security context of the SCG; and a (header) compression function of the SCG.

For operation 3, the MCG split DRB may perform direct data receiving or sending as configured by the network device or agreed by the protocol, while the DRB corresponding to the data to be sent by the UE is the MCG split DRB, and the UE uses the Msg 3 to send uplink data, then the UE resumes the configuration information corresponding to the MCG stored before sending the uplink data using the Msg 3. For example, the configuration information may include: PDCP configuration information of the SRB and the DRB corresponding to the MCG; a security context of the MCG; and a (header) compression function of the MCG.

For operation 4, only the SCG split DRB may perform direct data receiving or sending as configured by the network device or agreed by the protocol, while the DRB corresponding to the data to be sent by the UE is the SCG split DRB, and the UE uses the Msg 3 to send uplink data, then the UE resumes the configuration information corresponding to the SCG stored before sending the uplink data using the Msg 3. For example, the configuration information may include: PDCP configuration information of the SRB and the DRB corresponding to the SCG; a security context of the SCG; and a (header) compression function of the SCG.

For operation 5, the SCG split DRB may perform direct data receiving or sending as configured by the network side or agreed by the protocol, while the DRB corresponding to the data to be sent by the UE is the SCG split DRB, and the UE uses the Msg 3 to send uplink data, then the UE resumes PDCP configuration information corresponding to the SCG split bearer, an RLC configuration of the SCG split bearer, and an SRB configuration of the MCG stored before sending the uplink data using the Msg 3. In this case, the RLC configuration of the SCG split DRB is still suspended, so that data of the SCG split DRB is sent through MCG RLC. The PDCP configuration information corresponding to the SCG split bearer may include: PDCP configuration information corresponding to the SCG split bearer. The PDCP configuration information may include establishing a PDCP entity or rebuilding a PDCP entity; restoring a PDCP state variable;

a security context of the SCG; and a (header) compression function of the SCG.

In an embodiment, in a case that only the configuration of the MCG bearer is resumed, the first operation further includes: retaining and suspending the SCG configuration of the bearer.

In another embodiment, in a case that only the configuration of the SCG bearer is resumed, the first operation further includes: retaining and suspending the MCG configuration of the bearer.

In another embodiment, in a case that the PDCP configuration and the MCG configuration of the SCG split bearer are resumed, the first operation further includes at least one of the following:

resuming a configuration including MCG radio link control of the SCG split bearer in the MCG configuration;
resuming a configuration including an MCG signaling radio bearer in the MCG configuration; or
retaining and suspending a configuration of another DRB in the MCG configuration other than the SCG split bearer.

It should be understood that in an embodiment, a restriction condition for direct data receiving or sending may further include other restriction conditions, to be specific, the first condition may further include at least one of the following:

that a size of the transmission data is equal to, less than, or greater than a first threshold preset by a threshold; or
that a cell signal strength measured by a terminal is equal to, less than, or greater than a second threshold preset by the threshold.

In this embodiment, if all first conditions are satisfied, it is determined that the direct data receiving and sending mode is allowed for data transmission.

To better understand this application, the following uses an example in which a terminal sends or receives data to describe an implementation process of this application in detail.

Step 1: A network device sends indication information for retaining a context configuration to UE, to instruct the UE to retain a context configuration of the UE. The context configuration is used by the UE to resume connection and/or resume data receiving and sending. For example, when the network device releases UE in a CONNECTED state to an IDLE/INACTIVE state, the network device sends a suspend indication information in an RRC Release message. The suspend indication information is used to instruct the UE to retain the context configuration.

In some embodiments, "configuration information of the direct data receiving or sending mode" of the UE is configured by the network device or agreed by the protocol. The "configuration information of the direct data receiving or sending mode" includes at least one of the following:

the direct data receiving or sending mode; or
bearer information using the direct data receiving or sending.

The "indication information for retaining a context configuration" and the "configuration information of the direct data receiving or sending mode" may be sent in a same message, for example, may be sent through the RRC Release message; or may also be sent in different message, for example, the "indication information for retaining a context configuration" is sent through the RRC Release message, and the "configuration information of the direct data receiving or sending mode" is sent through a SIB message.

In some embodiments, "data types" of the "direct data receiving or sending" include at least one of the following:
data of a DRB;
data of a QoS flow;
data of a PDU session; or
a user plane data carried in an SRB.

In some embodiments, the "direct data receiving or sending mode" includes at least one of the following:
a direct data sending mode, for example, an uplink data sending; or
a direct data receiving mode, for example, a downlink data receiving.

The direct data sending mode includes at least one of the following:
sending data in a Msg 3 in a 4-step random access procedure;
sending data in a Msg A in a 2-step random access procedure; or
sending data in a dedicated uplink PUSCH resource configured by the network.

The direct data receiving mode includes at least one of the following:
receiving data in a Msg 4 in the 4-step random access procedure;
receiving data in a Msg B in the 2-step random access procedure; or
receiving data from the downlink resource corresponding to the dedicated uplink resource configured by the network, for example, after the UE sends DRB data or an SRB request message in the dedicated PUSCH resource, the UE obtains Physical downlink shared channel (PDSCH) scheduling information by listening to a specific UE identity in a PDCCH resource corresponding to the PUSCH. The PDSCH includes downlink received data of a DRB of the UE.

In some embodiments, the "bearer information using the direct data receiving or sending" includes at least one of the following:
- a bearer type using the direct data receiving or sending mode; or
- a bearer identity using the direct data receiving or sending mode.

The "bearer information using the direct data receiving or sending" includes at least one of the following:
- an MCG DRB;
- an SCG DRB;
- an MCG Split DRB, that is, the PDCP of the bearer is in the MCG, and two RLCs of the bearer are in the MCG and the SCG separately; or
- an SCG Split DRB, that is, the PDCP of the bearer is in the SCG, and two RLCs of the bearer are in the MCG and the SCG separately.

The "bearer identity using the direct data receiving or sending" includes at least one of the following:
- a DRB identity;
- a Qos flow identity;
- a PDU session identity; or
- a cell group identity, for example, an MCG identity or an SCG identity.

Step 2: When the UE sends or receives data, and a condition for sending or receiving the data satisfies a restriction condition for direct data receiving or sending configured by a network side or agreed by a protocol, the UE allows triggering direct data sending or receiving. Otherwise, the UE triggers the second access procedure to establish or resume connection. The "restriction condition for direct data receiving or sending" includes at least one of the following:

Condition 1: A bearer identity corresponding to the data is the same as the "bearer identity for direct data receiving or sending" configured by the network device or agreed by the protocol.

Condition 2: A data transmission mode corresponding to the data is the same as the "direct data receiving or sending mode" configured by the network side or agreed by the protocol. For example, as configured by the network device or agreed by the protocol, "data can be sent in the Msg 3 of the 4-step random access procedure", and the method supported by the data to be sent by the UE may also be "sending data in the Msg 3 of the 4-step random access procedure".

In this embodiment, the restriction condition for direct data receiving or sending may also be combined with another restriction condition, and the another restriction may include at least one of the following:
- that a size of the transmission data is less than or equal to a first threshold preset; or
- that a cell signal strength measured by a terminal is greater than or equal to a second threshold.

In other embodiments, the size of the transmission data may be set to be greater than or equal to a third threshold, and the cell signal strength measured by the terminal may be set to be less than or equal to a fourth threshold, which is not further limited herein.

For condition 1, if the bearer information corresponding to some data of the UE is the same as the "bearer information using the direct data receiving or sending" as configured by the network device or agreed by the protocol, and the bearer information corresponding to the some data is different from "bearer indication using the direct data receiving or sending" as configured by the network side or agreed by the protocol, based on network side configuration or protocol agreement, the processing mode of the UE includes any one of the following:

Data having the same bearer information corresponding to the data with the "bearer information using the direct data receiving or sending" configured by the network side or agreed by the protocol uses the "direct data receiving or sending" mode. For example, it is configured by a network device or agreed by a protocol that only an MCG DRB can receive or send data directly, while both the MCG DRB and the SCG DRB of the UE can send data. Then, the UE only uses the "direct data sending or receiving" for the MCG DRB, while the SCG DRB is still in a suspended state.

A conventional connection establishment procedure or a connection establishment procedure is used.

A UE behavior of "direct data sending or receiving" includes any one of the following:

Method 1: If data of the "direct data sending or receiving" is sent through an MCG bearer, the UE resumes configuration of the MCG when the UE uses the "direct data sending or receiving". For example, only the MCG DRB may perform direct data receiving or sending as configured by the network device or agreed by the protocol, while the DRB corresponding to the data to be sent by the UE is the MCG DRB, and the UE uses the Msg 3 to send uplink data, then the UE resumes the configuration information corresponding to the MCG stored before sending the uplink data using the Msg 3. For example, the configuration information may include: PDCP configuration information of the SRB and the DRB corresponding to the MCG (for example, establishing a PDCP entity or rebuilding a PDCP entity; and restoring a PDCP state variable); a security context of the MCG; and a (header) compression function of the MCG.

Method 2: If the data of the "direct data sending or receiving" is sent through an SCG bearer, the UE resumes the configuration of the SCG when the UE uses the "direct data sending or receiving". For example, the SCG DRB may perform direct data receiving or sending as configured by the network device or agreed by the protocol, while the DRB corresponding to the data to be sent by the UE is the SCG DRB, and the UE uses the Msg 3 to send uplink data, then the UE resumes the configuration information corresponding to the SCG stored before sending the uplink data using the Msg 3. For example, the configuration information may include: PDCP configuration information of the SRB and the DRB corresponding to the SCG; a security context of the SCG; and a (header) compression function of the SCG.

Method 3: If data of the "direct data sending or receiving" is sent through an MCG bearer, the UE resumes the configuration of the MCG when the UE uses the "direct data sending or receiving". For example, the MCG split DRB may perform direct data receiving or sending as configured by the network device or agreed by the protocol, while the DRB corresponding to the data to be sent by the UE is the MCG split DRB, and the UE uses the Msg 3 to send uplink data, then the UE resumes the configuration information corresponding to the MCG stored before sending the uplink data using the Msg 3. For example, the configuration information may include: PDCP configuration information of the SRB and the DRB corresponding to the MCG; a security context of the MCG; and a (header) compression function of the MCG.

Method 4: If data of the "direct data sending or receiving" is sent through an SCG split bearer, the UE resumes configuration of the SCG when the UE uses the "direct data sending or receiving". For example, the SCG split DRB may perform direct data receiving or sending as configured by the network device or agreed by the protocol, while the DRB corresponding to the data to be sent by the UE is the SCG split DRB, and the UE uses the Msg 3 to send uplink data, then the UE resumes the configuration information corresponding to the SCG stored before sending the uplink data using the Msg 3. For example, the configuration information may include: PDCP configuration information of the SRB and the DRB corresponding to the SCG; a security context of the SCG; and a (header) compression function of the SCG.

Method 5: If data of the "direct data sending or receiving" is sent through an SCG split bearer, the UE resumes PDCP configuration and MCG configuration of the SCG split bearer when the UE uses the "direct data sending or receiving". For example, the SCG split DRB may perform direct data receiving or sending as configured by the network side or agreed by the protocol, while the DRB corresponding to the data to be sent by the UE is the SCG split DRB, and the UE uses the Msg 3 to send uplink data, then the UE resumes PDCP configuration information corresponding to the SCG split bearer, a RLC configuration of the SCG split bearer, and an SRB configuration of the MCG stored before sending the uplink data using the Msg 3. In this case, the RLC configuration of the SCG split DRB is still suspended, so that data of the SCG split DRB is sent through MCG RLC. The PDCP configuration information corresponding to the SCG split bearer may include: PDCP configuration information corresponding to the SCG split bearer. The PDCP configuration information may include establishing a PDCP entity or rebuilding a PDCP entity; restoring a PDCP state variable; a security context of the SCG; and a (header) compression function of the SCG.

For method 1 and method 3, in some embodiments, the UE behavior may include that if the configuration information stored in the UE includes SCG configuration information of the bearer, the UE deletes or retains the SCG configuration information of the bearer based on the network side configuration or the protocol agreement. In an embodiment, the UE deletes the SCG configuration of the bearer while resuming the MCG configuration of the bearer. In another embodiment, the UE retains but suspends (that is, does not use) the SCG configuration of the bearer while resuming the MCG configuration of the bearer. After receiving resume SCG configuration information indicated by the network side (for example, receiving a RRCResume message), the UE executes resuming the SCG configuration procedure of the bearer. For example, the DRB and SRB configuration information of the SCG of the bearer (for example, PDCP and RLC configuration); and the security context of the SCG is resumed.

For method 2 and method 4, in some embodiments, the UE behavior may include that the UE retains the MCG configuration information of the bearer based on the network side configuration or protocol agreement. For example, the UE retains but suspends (that is, does not use) the MCG configuration of the bearer while resuming the SCG configuration. After receiving the resume MCG configuration information indicated by the network device (for example, receiving the RRC Resume message), the UE executes resuming the MCG configuration procedure of the bearer. For example, the DRB and SRB configuration information of the MCG of the bearer is resumed.

For method 5, in some embodiments, the UE behavior further includes at least one of the following:
that the resumed the MCG configuration includes MCG RLC configuration of the SCG split bearer; or
that the resumed MCG configuration includes the configuration of the MCG SRB.

Configuration of another DRB other than the SCG split bearer in the MCG configuration is remained and suspended. For example, the configuration of the MCG DRB is retained.

For the "direct data sending or receiving", in some embodiments, a data sending end can indicate from which cell group the sent data comes. For example, the UE indicates that Logical Channel ID (LCID)-1 in the sent MAC PDU is LCID-1 of the MCG or the SCG.

The conventional connection establishment (or resume) procedure can be understood as skipping a procedure of data sending or receiving of data bearer before the initial access procedure is completed. For example, the UE only sends a connection resume request message in the Msg 3 or the Msg 4, and does not send the data in the DRB. The UE resumes the data receiving and sending of the data bearer only after receiving the connection resume message sent by the network side.

It should be noted that an execution subject of the access procedure processing method provided by this embodiment of this application may be an access procedure processing apparatus, or a control module for executing the access procedure processing method in the access procedure processing apparatus. In this embodiment of this application, an example in which the access procedure processing apparatus executes the access procedure processing method is used to describe the access procedure processing apparatus provided in this embodiment of this application.

Figure 3:
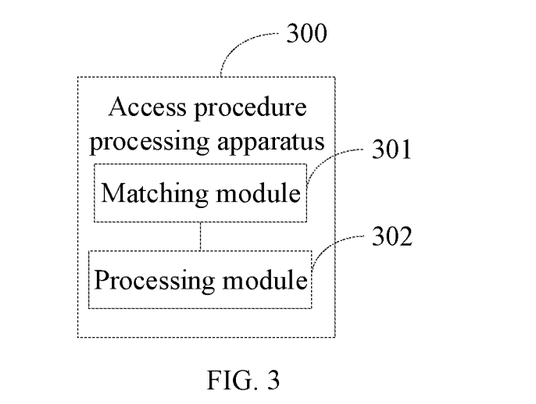
FIG. 3 is a structural diagram of a communications device according to an embodiment of this application.

Referring to FIG. 3, FIG. 3 is a structural diagram of an access procedure processing apparatus according to an embodiment of this application. As shown in FIG. 3, the access procedure processing apparatus 300 includes:
a matching module 301, configured to perform matching between N pieces of to-be-transmitted transmission data and a first condition; and
a processing module 302, configured to, based on a matching result, execute a first access procedure or a second access procedure.

M pieces of transmission data are transmitted in the first access procedure, the N pieces of the transmission data are not transmitted in the second access procedure, and the M pieces of the transmission data are data matching the first condition in the N pieces of the transmission data, where the M and the N are positive integers, and the M is less than or equal to the N. The first condition is a restriction condition for the data transmitted during the access procedure, where the first condition includes: first bearer information corresponding to the transmission data and/or a first transmission mode matching configuration information, and the configuration information includes second bearer information and/or a second transmission mode.

In some embodiments, the processing module 302 is configured to, in a case that at least one piece of the N pieces of the transmission data satisfies the first condition, execute the first access procedure; or in a case that the N pieces of the transmission data do not satisfy the first condition, execute the second access procedure.

In some embodiments, the processing module 302 is configured to, in a case that the N pieces of the transmission data satisfy the first condition, execute the first access procedure; or in a case that at least one piece of the N pieces of the transmission data does not satisfy the first condition, execute the second access procedure.

In some embodiments, the second bearer information includes at least one of the following: a bearer identity or a bearer type.

In some embodiments, the bearer type includes at least one of the following: a master cell group MCG data radio bearer DRB, a secondary cell group SCG DRB, an MCG split DRB, or an SCG split DRB.

In some embodiments, the bearer identity includes at least one of the following: a DRB identity, a quality of service flow identity, a protocol data unit session identity, or a cell group identity.

In some embodiments, the second transmission mode includes at least one of the following: a data sending mode or a data receiving mode.

In some embodiments, the data sending mode includes at least one of the following:
 that a terminal sends data in a Msg 3 in a 4-step random access procedure;
 that the terminal sends data in a Msg A in a 2-step random access procedure;
 that the terminal sends data in a configured dedicated uplink resource;
 that a network device sends data in a Msg 4 in the 4-step random access procedure;
 that the network device sends data in a Msg B in the 2-step random access procedure; or
 that the network device sends data in a downlink resource corresponding to the configured dedicated uplink resource.

In some embodiments, the data receiving mode includes at least one of the following:
 that the network device receives data in a Msg 3 in a 4-step random access procedure;
 that the network device receives data in a Msg B in a 2-step random access procedure;
 that the network device receives data in a configured dedicated uplink resource;
 that the terminal receives data in a Msg 4 in the 4-step random access procedure;
 that the terminal receives data in a Msg B in the 2-step random access procedure; or
 that the terminal receives data in a downlink resource corresponding to the configured dedicated uplink resource.

In some embodiments, the M pieces of the transmission data includes at least one of the following:
 data of a DRB;
 data of a quality of service flow;
 data of a PDU session; or
 a user plane data carried in a signaling radio bearer SRB.

In some embodiments, the configuration information is configured by a network device or agreed by a protocol.

In some embodiments, in a case that the configuration information is configured by a network device, the configuration information is carried in a radio resource control RRC release message or a system information block message.

In some embodiments, before the performing matching between N pieces of the to-be-transmitted transmission data and a first condition, the method further includes:
 transmission indication information, where the indication information is used to instruct a terminal to retain a context configuration, and the context configuration is used to resume a connection and/or resume data transmission.

In some embodiments, the executing the first access procedure includes:
 before the M pieces of the transmission data is transmitted, executing a first operation.

The first operation includes any one of the following:
 in a case that the M pieces of the transmission data are transmitted through an MCG bearer, resuming an MCG configuration of the bearer;
 in a case that the M pieces of the transmission data are transmitted through an SCG bearer, resuming an SCG configuration of the bearer;
 in a case that the M pieces of the transmission data are transmitted through an MCG split bearer, resuming an MCG configuration of the bearer;
 in a case that the M pieces of the transmission data are transmitted through an SCG split bearer, resuming an SCG configuration of the bearer; or
 in a case that the M pieces of the transmission data are transmitted through the SCG split bearer, resuming a PDCP configuration and an MCG configuration of the SCG split bearer.

In some embodiments, in a case that only the MCG configuration of the bearer is resumed, the first operation further includes: retaining and suspending the configuration of the SCG bearer.

In some embodiments, in a case that only the SCG configuration of the bearer is resumed, the first operation further includes: retaining and suspending the MCG configuration of the bearer.

In some embodiments, in a case that the PDCP configuration and the MCG configuration of the SCG split bearer are resumed, the first operation further includes at least one of the following:
 resuming a configuration including MCG radio link control of the SCG split bearer in the MCG configuration;
 resuming a configuration including an MCG signaling radio bearer in the MCG configuration; or
 retaining and suspending a configuration of another DRB in the MCG configuration other than the SCG split bearer.

The access procedure processing apparatus provided in this embodiment of this application can implement the processes in the method embodiment in FIG. 2. To avoid repetition, details are not described herein again.

The access procedure processing apparatus in this embodiment of this application may be an apparatus, or a component, an integrated circuit, or a chip in a terminal. The apparatus may be a mobile terminal or a non-mobile terminal. For example, the mobile terminal may include, but is not limited to, a type of the terminal 11 listed above. The non-mobile terminal may be a server, a Network Attached Storage (NAS), a personal computer (PC), a television (TV), a teller machine or a self-service machine. This is not specifically limited in this embodiment of this application.

The access procedure processing apparatus in this embodiment of this application may be an apparatus with an operating system. The operating system may be an Android operating system, may be an iOS operating system, or may further be another possible operating system, which is not specifically limited in this embodiment of this application.

The access procedure processing apparatus provided in this embodiment of this application can implement the processes implemented in the method embodiment in FIG. 2, with the same technical effects achieved. To avoid repetition, details are not described herein again.

Figure 4:
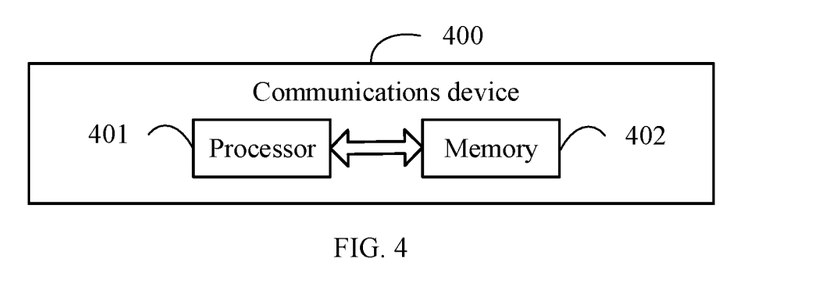
FIG. 4 is a structural diagram of another communications device according to an embodiment of this application.

As shown in FIG. 4, an embodiment of this application further provides a communications device 400, including a processor 401, a memory 402, and a program or an instruction stored in the memory 402 and capable of running on the processor 401. For example, when the communications device 400 is a terminal, and the program or the instruction is executed by the processor 401, the processes of the foregoing access procedure processing method embodiments are implemented, with the same technical effects achieved. To avoid repetition, details are not described herein again. When the communications device 400 is a network-side device, and the program or the instruction is executed by the processor 401, the processes of the foregoing access procedure processing method embodiments are implemented, with the same technical effects achieved. To avoid repetition, details are not described herein again.

Figure 5:
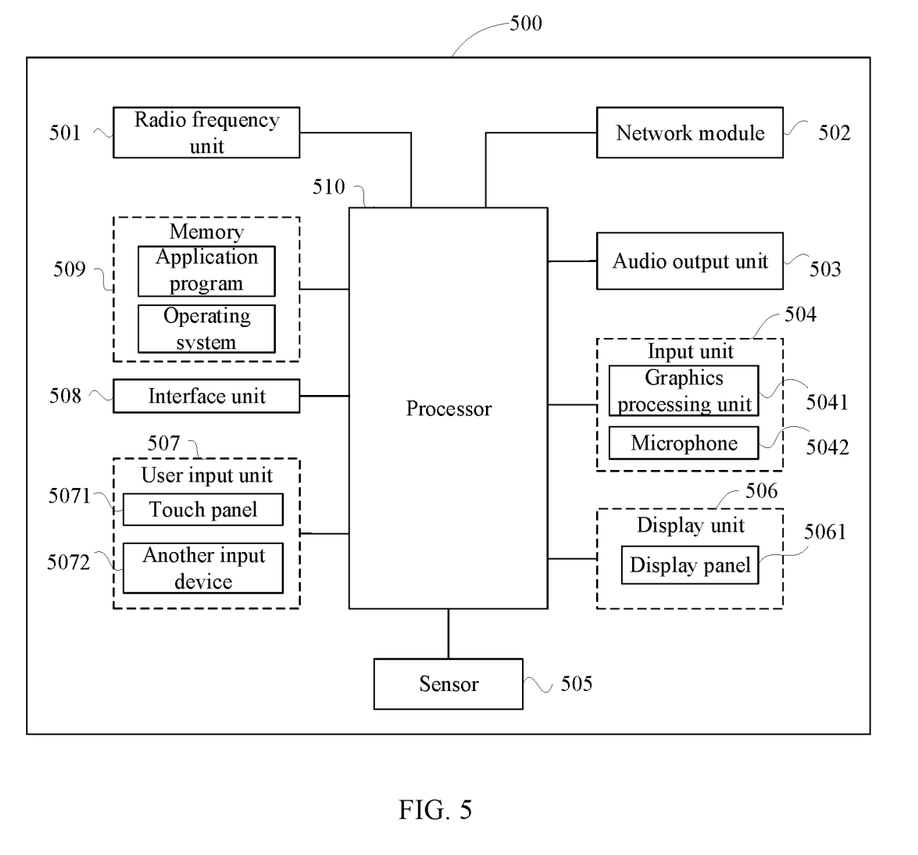
FIG. 5 is a structural diagram of a terminal according to an embodiment of this application.

FIG. 5 is a schematic diagram of a hardware structure of a terminal for implementing the embodiments of the present application.

The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

Persons skilled in the art can understand that the terminal 500 may further include a power supply (such as a battery) that supplies power to each component. The power supply may be logically connected to the processor 510 by using a power management system, to implement functions such as charging, discharging, and power consumption management by using the power management system. A structure of the terminal shown in FIG. 5 does not constitute a limitation on the terminal, and the terminal may include more or fewer components than those shown in the figure, or combine some components, or have different component arrangements, and details are not further described herein.

It should be understood that in this embodiment of this application, the input unit 504 may include a Graphics Processing Unit (GPU) 5041 and a microphone 5042. The graphics processing unit 5041 processes image data of a static picture or a video that is obtained by an image capture apparatus (for example, a camera) in a video capture mode or an image capture mode. The display unit 506 may include a display panel 5061, and the display panel 5061 may be configured in a form of a liquid crystal display, an organic light-emitting diode, or the like. The user input unit 507 includes a touch panel 5071 and another input device 5072. The touch panel 5071 is also referred to as a touch screen. The touch panel 5071 may include two parts: a touch detection apparatus and a touch controller. The another input device 5072 may include but is not limited to a physical keyboard, a function key (such as a volume control key or an on/off key), a trackball, a mouse, a joystick, and the like. Details are not described herein again.

In this embodiment of this application, the radio frequency unit 501 may, after receiving downlink data from a network device, send the downlink information to the processor 510 for processing, and in addition, send uplink data to the network device. Usually, the radio frequency unit 501 includes but is not limited to an antenna, at least one amplifier, a transceiver, a coupler, a low noise amplifier, a duplexer, and the like.

The memory 509 may be configured to store a software program or instruction and various data. The memory 109 may mainly include a program storage area or an instruction area and a data storage area. The program storage area or the instruction area may store an operating system, an application program or instruction required by at least one function (such as a sound play function or a picture play function), and the like. In addition, the memory 509 may include a high-speed random access memory, or may further include a non-volatile memory. The non-volatile memory may be a Read-Only Memory (ROM), a Programmable ROM (PROM), an Erasable PROM (EPROM), an Electrically EPROM (EEPROM), or a flash memory. For example, at least one magnetic disk storage component, a flash memory component, or another volatile solid-state storage component.

The processor 510 may include one or more processing units. In some embodiments, the processor 510 may integrate an application processor with a modem processor. The application processor mainly processes the operating system, a user interface, the application program or instruction, and the like, and the modem processor mainly processes wireless communication such as a baseband processor. It can be understood that, the modem processor may not be integrated into the processor 510.

The processor 510 is configured to perform matching between N pieces of to-be-transmitted transmission data and a first condition.

The radio frequency unit 501 is configured to, based on a matching result, execute a first access procedure or a second access procedure.

M pieces of transmission data are transmitted in the first access procedure, the N pieces of the transmission data are not transmitted in the second access procedure, and the M pieces of the transmission data are data matching the first condition in the N pieces of the transmission data, where the M and the N are positive integers, and the M is less than or equal to the N. The first condition is a restriction condition for the data transmitted during the access procedure, where the first condition includes: first bearer information corresponding to the transmission data and/or a first transmission mode matching configuration information, and the configuration information includes second bearer information and/or a second transmission mode.

It should be understood that, in this embodiment, the processor 510 and the radio frequency unit 501 can implement processes implemented by the network in the method embodiment in FIG. 2. To avoid repetition, details are not described herein again.

Figure 6:
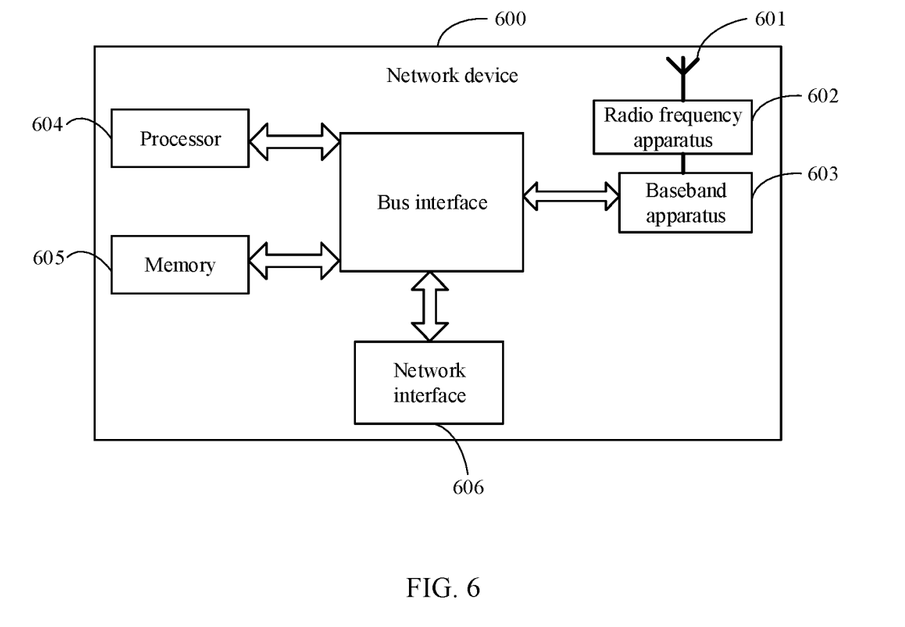
FIG. 6 is a structural diagram of a network device according to an embodiment of this application.

An embodiment of the present application further provides a network side device. As shown in FIG. 6, the network device 600 includes an antenna 601, a radio frequency apparatus 602, and a baseband apparatus 603. The antenna 601 is connected to the radio frequency apparatus 602. In an uplink direction, the radio frequency apparatus 602 receives information by using the antenna 601, and sends the received information to the baseband apparatus 603 for processing. In a downlink direction, the baseband apparatus 603 processes to-be-sent information, and sends the to-be-sent information to the radio frequency apparatus 602. After processing the received information, the radio frequency apparatus 602 sends the information by using the antenna 601.

The foregoing band processing apparatus may be located in the baseband apparatus 603, and the method performed by the network side device in the foregoing embodiment may be implemented in the baseband apparatus 603. The baseband apparatus 603 includes a processor 604 and a memory 605.

The baseband apparatus 603 may include, for example, at least one baseband board, and a plurality of chips are arranged on the baseband board. As shown in FIG. 6, one of the chips is, for example, the processor 604, which is connected to the memory 605, to invoke a program in the memory 605, so as to perform the operations of the network device shown in the foregoing method embodiment.

The baseband apparatus 603 may further include a network interface 606, which is configured to exchange information with the radio frequency apparatus 602. The interface is, for example, a common public radio interface (CPRI).

The network-side device in this embodiment of this invention further includes an instruction or a program stored in the memory 605 and capable of running on the processor 604. The processor 604 invokes the instruction or the program in the memory 605 to perform the method performed by the modules shown in FIG. 3, and a same technical effect can be achieved. To avoid repetition, details are not described herein again.

An embodiment of this application further provides a readable storage medium. The readable storage medium stores a program or an instruction. When the program or the instruction is executed by a processor, the processes in the foregoing embodiments of the access procedure processing method are implemented, and a same technical effect can be achieved. To avoid repetition, details are not described herein again.

The processor is a processor in the electronic device in the foregoing embodiments. The readable storage medium includes a computer-readable storage medium, such as a computer Read-Only Memory (ROM), a Random Access Memory (RAM), a magnetic disk, or an optical disc.

An embodiment of this application also provides a chip. The chip includes a processor and a communications interface, and the communications interface is coupled to the processor. The processor is configured to run a network device program or an instruction to implement various processes of the foregoing access procedure processing method embodiment, with the same technical effects achieved. To avoid repetition, details are not described herein again.

It should be understood that the chip mentioned in the embodiments of this application may also be referred to as a system-on-chip, a system chip, a chip system, a system-on-a-chip, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not preclude the presence of other identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the specific application and design constraints of the technical solution. A person skilled in the art may use different methods to implement the described functions for each particular application, but it should not be considered that the implementation goes beyond the scope of the present disclosure.

It may be clearly understood by a person skilled in the art that, for convenience and brevity of description, for a specific working process of the foregoing described system, apparatus, and unit, reference may be made to a corresponding process in the foregoing method embodiments, and details are not described herein again.

In the embodiments provided in the present application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a base station, or the like) to perform the method described in the embodiments of the present application.

A person of ordinary skill in the art may understand that all or some of the processes in the foregoing method embodiments may be implemented by using a computer program to control related hardware. The program may be stored in a computer-readable storage medium. When the program is executed, the processes in the foregoing method embodiments may be performed. The foregoing storage medium may be a magnetic disc, an optical disc, a Read-Only Memory (ROM), a Random Access Memory (RAM), or the like.

It can be understood that the embodiments described in the present disclosure may be implemented by hardware, software, firmware, middleware, microcode, or a combination thereof. For hardware implementation, the module, unit, and subunit may be implemented in one or more Application Specific Integrated Circuit (ASIC), Digital Signal Processor (DSP), DSP Device (DSPD), Programmable Logic Device (PLD), Field-Programmable Gate Array (FPGA), general-purpose processors, controllers, microcontrollers, microprocessors, and other electronic units for performing the functions described in this disclosure, or a combination thereof.

For software implementations, the techniques described in the embodiments of the present disclosure may be implemented by modules (for example, processes and functions) that perform the functions described in the embodiments of the present disclosure. A software code may be stored in the memory and executed by the processor. The memory may be implemented in the processor or outside the processor.

The embodiments of the present application are described above with reference to the accompanying drawings, but the present application is not limited to the foregoing specific implementations. The foregoing specific implementations are merely schematic instead of restrictive. Under enlightenment of the present application, a person of ordinary skills in the art may make many forms without departing from aims and the protection scope of claims of the present application, all of which fall within the protection scope of the present application.

The invention claimed is:

1. A method for access procedure processing, comprising:
performing matching between N pieces of to-be-transmitted transmission data and a first condition; and
when the N pieces of the transmission data satisfy the first condition, executing a first access procedure,
wherein the N pieces of transmission data are transmitted in the first access procedure, and the first condition is a restriction condition for the data transmitted during the access procedure, wherein the first condition comprises: first bearer information corresponding to the transmission data or a first transmission mode matching configuration information, and the configuration information comprises second bearer information or a second transmission mode,
wherein executing the first access procedure comprises sending, by a terminal, data to a network device directly through at least one of the following:
a Msg 3 in a 4-step random access procedure for initial access;
a Msg A in a 2-step random access procedure for initial access; or
a dedicated uplink resource configured by a network; or
wherein executing the first access procedure comprises sending, by the network device, data to the terminal directly through at least one of the following:
a Msg 4 in the 4-step random access procedure for initial access;
a Msg B in the 2-step random access procedure for initial access; or
a downlink feedback resource corresponding to the dedicated uplink resource configured by the network.

2. The method according to claim 1, wherein executing the first access procedure comprises:
when at least one piece of the N pieces of the transmission data satisfies the first condition, executing the first access procedure.

3. The method according to claim 1, further comprising:
when at least one piece of the N pieces of the transmission data does not satisfy the first condition, executing a second access procedure.

4. The method according to claim 1, wherein the second bearer information comprises at least one of the following: a bearer identity or a bearer type.

5. The method according to claim 4, wherein the bearer type comprises at least one of the following: a master cell group (MCG) data radio bearer (DRB), a secondary cell group (SCG) DRB, an MCG split DRB, or an SCG split DRB.

6. The method according to claim 4, wherein the bearer identity comprises at least one of the following: a DRB identity, a quality of service flow identity, a protocol data unit session identity, or a cell group identity.

7. The method according to claim 1, wherein the second transmission mode comprises at least one of the following: a data sending mode or a data receiving mode.

8. The method according to claim 7, wherein the data sending mode comprises at least one of the following:
that the terminal sends data in the Msg 3 in the 4-step random access procedure;
that the terminal sends data in the Msg A in the 2-step random access procedure;
that the terminal sends data in the dedicated uplink resource;
that the network device sends data in the Msg 4 in the 4-step random access procedure;
that the network device sends data in the Msg B in the 2-step random access procedure; or
that the network device sends data in the downlink feedback resource corresponding to the dedicated uplink resource.

9. The method according to claim 7, wherein the date receiving mode comprises at least one of the following:
that the network device receives data in the Msg 3 in the 4-step random access procedure;
that the network device receives data in the Msg A in a 2-step random access procedure;
that the network device receives data in the dedicated uplink resource;
that the terminal receives data in the Msg 4 in the 4-step random access procedure;
that the terminal receives data in the Msg B in the 2-step random access procedure; or
that the terminal receives data in the downlink feedback resource corresponding to the dedicated uplink resource.

10. The method according to claim 1, wherein the IN pieces of the transmission data comprise at least one of the following:
data of a data radio bearer (DRB);
data of a quality of service flow;
data of a protocol data unit (PDU) session; or
a user plane data carried in a signaling radio bearer (SRB).

11. The method according to claim 1, wherein the configuration information is configured by the network device or agreed by a protocol.

12. The method according to claim 11, wherein when the configuration information is configured by the network device, the configuration information is carried in a radio resource control (RRC) release message or a system information block message.

13. The method according to claim 1, wherein before the performing matching between N pieces of the to-be-transmitted transmission data and a first condition, the method further comprises:
transmitting or receiving indication information, wherein the indication information is used to instruct the terminal to retain a context configuration, and the context configuration is used to resume a connection or resume data transmission.

14. The method according to claim 1, wherein executing the first access procedure comprises:
before the N pieces of the transmission data are transmitted, executing a first operation,
wherein the first operation comprises any one of the following:
when the N pieces of the transmission data are transmitted through an MCG bearer, resuming an MCG configuration of the bearer;
when the N pieces of the transmission data are transmitted through an SCG bearer, resuming an SCG configuration of the bearer;
when the NI pieces of the transmission data are transmitted through an MCG split bearer, resuming an MCG configuration of the bearer;
when the N pieces of the transmission data are transmitted through an SCG split bearer, resuming an SCG configuration of the bearer; or
when the N pieces of the transmission data are transmitted through the SCG split bearer, resuming a PDCP configuration and an MCG configuration of the SCG split bearer.

15. The method according to claim 14, wherein when only the configuration of the MCG bearer is resumed, the first operation further comprises: retaining and suspending the SCG configuration of the bearer.

16. The method according to claim 14, wherein when only the configuration of the SCG bearer is resumed, the first operation further comprises: retaining and suspending the MCG configuration of the bearer.

17. The method according to claim 14, wherein when the PDCP configuration and the MCG configuration of the SCG split bearer are resumed, the first operation further comprises at least one of the following:
resuming a configuration comprising MCG radio link control of the SCG split bearer in the MCG configuration;
resuming a configuration comprising an MCG signaling radio bearer in the MCG configuration; or
retaining and suspending a configuration of another DRB in the MCG configuration other than the SCG split bearer.

18. A communications device, comprising:
a memory storing a computer program; and
a processor coupled to the memory and configured to execute the computer program to perform operations comprising:
performing matching between N pieces of to-be-transmitted transmission data and a first condition; and
when the N pieces of the transmission data satisfy the first condition, executing a first access procedure-or-a-second-access-procedure,
wherein the N pieces of transmission data are transmitted in the first access procedure, and the first condition is a restriction condition for the data transmitted during the access procedure, wherein the first condition comprises: first bearer information corresponding to the transmission data or a first transmission mode matching configuration information, and the configuration information comprises second bearer information or a second transmission mode,
wherein executing the first access procedure comprises sending, by a terminal, data to a network device directly through at least one of the following:
a Msg 3 in a 4-step random access procedure for initial access;
a Msg A in a 2-step random access procedure for initial access; or
a dedicated uplink resource configured by a network; or
wherein executing the first access procedure comprises sending, by the network device, data to the terminal directly through at least one of the following:
a Msg 4 in the 4-step random access procedure for initial access;
a Msg B in the 2-step random access procedure for initial access; or
a downlink feedback resource corresponding to the dedicated uplink resource configured by the network.

19. The communications device according to claim 18, wherein executing the first access procedure comprises:
when at least one piece of the N pieces of the transmission data satisfies the first condition, executing the first access procedure.

20. A non-transitory computer-readable storage medium, storing a computer program, wherein the computer program, when executed by a processor of a communications device, causes the processor to perform operations comprising:
performing matching between N pieces of to-be-transmitted transmission data and a first condition; and
when the N pieces of the transmission data satisfy the first condition, executing a first access procedure,
wherein the N pieces of transmission data are transmitted in the first access procedure, and the first condition is a restriction condition for the data transmitted during the access procedure, wherein the first condition comprises: first bearer information corresponding to the transmission data or a first transmission mode matching configuration information, and the configuration information comprises second bearer information or a second transmission mode,
wherein executing the first access procedure comprises sending, by a terminal, data to a network device directly through at least one of the following:
a Msg 3 in a 4-step random access procedure for initial access;
a Msg A in a 2-step random access procedure for initial access; or
a dedicated uplink resource configured by a network; or
wherein executing the first access procedure comprises sending, by the network device, data to the terminal directly through at least one of the following:
a Msg 4 in the 4-step random access procedure for initial access;
a Msg B in the 2-step random access procedure for initial access; or
a downlink feedback resource corresponding to the dedicated uplink resource configured by the network.

* * * * *